United States Patent
Takahama et al.

[11] Patent Number: 5,811,192
[45] Date of Patent: Sep. 22, 1998

[54] TITANIUM DIOXIDE FILM HAVING PHOTOCATALYTIC ACTIVITY AND SUBSTRATE HAVING THE SAME

[75] Inventors: Koichi Takahama, Amagasaki; Hirotsugu Kishimoto, Toyonaka; Takaharu Nakagawa, Hirakata; Shigehito Deki, Kobe; Noboru Hashimoto, Suita, all of Japan

[73] Assignee: Matsushita Electric Works, Ltd., Kadoma, Japan

[21] Appl. No.: 713,845

[22] Filed: Sep. 12, 1996

[30] Foreign Application Priority Data

Jan. 12, 1996 [JP] Japan .................. 8-003942
Apr. 23, 1996 [JP] Japan .................. 8-101380
May 21, 1996 [JP] Japan .................. 8-125167

[51] Int. Cl.$^6$ .................................... B32B 15/04
[52] U.S. Cl. ................ 428/432; 428/469; 428/472; 428/472.1; 428/701; 428/702; 427/376.2; 427/376.4; 427/419.2; 427/435
[58] Field of Search .................. 428/432, 469, 428/472, 472.1, 701, 702; 427/372.2, 376.2, 376.4, 376.6, 419.2, 435

[56] References Cited

U.S. PATENT DOCUMENTS 5,595,813 1/1997 Ogawa ..................... 428/212

FOREIGN PATENT DOCUMENTS 0675086 10/1995 European Pat. Off. .

OTHER PUBLICATIONS

Patent Abstract of Japan, vol. 16, No. 114, published Mar. 23, 1992.
Patent Abstract of Japan, vol. 16, No. 394, published Aug. 21, 1992.
Patent Abstract of Japan, vol. 13, No. 302, published Jul. 12, 1989.
European Search Report and Annex.

*Primary Examiner*—Timothy M. Speer
*Attorney, Agent, or Firm*—Greenblum & Bernstein, P.L.C.

[57] ABSTRACT

There is provided a substrate of which the surface is coated with a titanium dioxide film having a photocatalytic activity, which substrate is obtained by:

depositing titanium dioxide in a film form on a surface of a substrate by contacting the substrate with a reaction solution containing ammonium titanium fluoride, water and an additive which shifts the following equilibrium reaction:

$$(NH_4)_2TiF_6 + 2H_2O \iff TiO_2 + 4HF + 2NH_4F$$

toward a right side, and
calcining the deposited titanium dioxide film.

17 Claims, No Drawings

TITANIUM DIOXIDE FILM HAVING PHOTOCATALYTIC ACTIVITY AND SUBSTRATE HAVING THE SAME

BACKGROUND OF THE INVENTION

1. Field of the Invention

The present invention relates to a titanium dioxide ($TiO_2$) film having a photocatalytic activity using a deposition phenomenon in a liquid phase and a process of forming the film, and a substrate having such a titanium dioxide film and a process of producing such a substrate.

2. Description of the Related Art

As a process of forming a titanium dioxide ($TiO_2$) film on a surface of a substrate such as a glass plate, a process is known in which the substrate is immersed in a titanium-hydrofluoric acid solution to which boric acid or aluminum chloride is added (see, for example, Japanese Patent Kokai Publication Nos. 59-141441 and 1-93443).

As another process of forming a titanium dioxide film, Japanese Patent Kokai Publication Nos. 3-285822 and 4-130017 describe a process in which an aqueous solution containing ammonium titanium fluoride is used.

According to the prior art processes as described above, the formation itself of the titanium dioxide films is merely known, and nothing is described regarding how their properties, especially photocatalytic activities are, or which industrial applications the films have.

Recently, a photocatalytic activity of titanium dioxide has been focused on, and a cleaning process for a gas or a liquid has been known in which a plate of which the surface is coated with a titanium dioxide film is placed in a channel for air or water containing harmful components. As other processes for the formation of the film of titanium dioxide having the photocatalytic activity, the Sol-Gel process, the CVD process, the Sputtering process, the Pyrosol process and the like have been known. These processes are described in, for example, Japanese Patent Kokai Publication Nos. 8-99041, 8-91839, 7-232080 and 8-103488.

Those processes can form the titanium dioxide film having a uniform thickness on an flat substrate such as plates, but it is difficult for them to form a uniform film as such on a substrate having uneven or complicated surfaces such as glass wool. In addition, the titanium dioxide films formed by the prior art processes have not necessarily sufficient photocatalytic activities.

SUMMARY OF THE INVENTION

It is, therefore, an object of the present invention to provide a titanium dioxide film having an improved photocatalytic activity and uniformity and also a substrate having such a film thereon. It is a further object of the present invention to provide a process of forming a titanium dioxide film and also a process of producing a substrate having the titanium dioxide film thereon.

The above objects are achieved by a titanium dioxide film having a photocatalytic activity which is obtained by depositing titanium dioxide in a film form while an additive is used in a reaction solution comprising ammonium titanium fluoride and water which additive shifts the following equilibrium reaction:

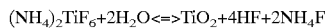

$(NH_4)_2TiF_6 + 2H_2O \Longleftrightarrow TiO_2 + 4HF + 2NH_4F$ toward a right side (i.e. a direction to increase a concentration of $TiO_2$ in the reaction solution), and calcining (or sintering) the deposited titanium dioxide film.

In other words, the present invention provides a process of forming a titanium dioxide film having a photocatalytic activity comprising the steps of:

depositing titanium dioxide in a film form by adding an additive in a reaction solution comprising ammonium titanium fluoride and water which additive shifts the following equilibrium reaction:

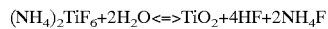

$(NH_4)_2TiF_6 + 2H_2O \Longleftrightarrow TiO_2 + 4HF + 2NH_4F$ toward a right side (i.e. a direction to increase a concentration of $TiO_2$ in the reaction solution), and calcining the deposited titanium dioxide film.

The film as such is formed by precipitation and accumulation of titanium dioxide in the solution. In a practically preferred embodiment, titanium dioxide is precipitated and accumulated on a surface of some substrate so that titanium dioxide is deposited in the form of a film, which is then calcined.

Thus, present invention provides a substrate of which the surface is coated with a titanium dioxide film having a photocatalytic activity, which substrate is obtained by:

depositing titanium dioxide in a film form on a surface of a substrate by contacting the substrate with a reaction solution comprising ammonium titanium fluoride, water and an additive which shifts the following equilibrium reaction:

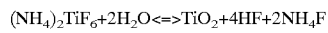

$(NH_4)_2TiF_6 + 2H_2O \Longleftrightarrow TiO_2 + 4HF + 2NH_4F$ toward a right side (i.e. a direction to increase a concentration of $TiO_2$ in the reaction solution), and calcining the deposited titanium dioxide film.

The present invention further provides a process of producing a substrate of which the surface is coated with a titanium dioxide film having a photocatalytic activity, which process comprises the steps of:

depositing titanium dioxide in a film form on a surface of a substrate by contacting the substrate with a reaction solution comprising ammonium titanium fluoride, water and an additive which shifts the following equilibrium reaction:

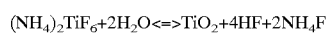

$(NH_4)_2TiF_6 + 2H_2O \Longleftrightarrow TiO_2 + 4HF + 2NH_4F$ toward a right side (i.e. a direction to increase $TiO_2$), and calcining the deposited titanium dioxide film on the substrate.

In the present invention, the contact of the substrate with the reaction solution includes, as one preferable embodiment, also immersion of the substrate in the reaction solution. When the substrate is contacted with, and preferably immersed in the reaction solution, the substrate may be placed in the reaction solution containing ammonium titanium fluoride, water and the additive. Alternatively, the substrate may be contacted with, and preferably immersed in water (or water containing ammonium titanium fluoride), to which ammonium titanium fluoride and the additive (or the additive) may be added thereafter.

In any one of the above inventions, washing and/or drying of the deposited titanium dioxide film may be optionally carried out before calcining it if appropriate.

DETAILED DESCRIPTION OF THE INVENTION

In the present invention, the additive is any component which shifts the above equilibrium reaction toward the direction to increase the concentration of $TiO_2$ in the reaction solution and it is not specifically limited as long as it does not adversely effect on the photocatalytic activity of the formed titanium dioxide film. Concretely, the additive is a component which reacts with fluorides (i.e. HF and $NH_4F$) in the solution so that hydrogen concentrations in the solution are reduced, namely a component which shifts the above reaction toward the right side so as to increase of a $TiO_2$ concentration in the solution, resulting in the concentration being likely to be within a supersaturated condition (thus, $TiO_2$ is likely to be precipitated and, in fact, precipitated). All the additive is not necessarily dissolved into the solution, and it may partly be present in a dispersed condition in the solution.

As a particularly preferable additive used in the present invention, boric acid, metal aluminum, aluminum chloride with ammonia and any combination thereof can be exemplified. The additive is preferably used in the form of an aqueous solution.

In the present invention, ammonium titanium fluoride is usually used in the form of an aqueous solution. It is preferably used in an amount within a range between 0.01 mol/l and 0.2 mol/l based on the solution total when a reaction of the additive with ammonium titanium fluoride starts (in the case where the substrate has been already placed in the solution which has not contained all the essential components and the balance component(s), for example the additive, is to be finally added to the solution) or the substrate starts being contacted with the reaction solution (in the case where the substrate is finally contacted with the solution which has all the essential components). If the concentration is below 0.01 mol/l, the reaction precipitating $TiO_2$ becomes very slow. If the amount is above 0.2 mol/l, not titanium dioxide but titanium fluoride oxide is precipitated. Although the above concentration range is suitable for the present invention, the concentration range is preferably between 0.8 mol/l and 1.5 mol/l and more preferably between 1.0 mol/l and 1.2 mol/l. With such concentration ranges, the formed film has improved uniformity and transparency; the latter is very important for the film to be formed on a substrate such as an antifouling glass of which the appearance is important from its commercial interest.

In the present invention, the additive is preferably used in an amount within a range between 0.05 mol/l and 0.5 mol/l based on the solution total when a reaction of the additive with ammonium titanium fluoride starts (in the case where the substrate has been already placed in the solution which has not contained all the essential components and the balance component(s), for example ammonium titanium fluoride, is to be finally added to the solution) or the substrate starts being contacted with the reaction solution (in the case where the substrate is finally contacted with the solution which has all the essential components). If the concentration is below 0.05 mol/l, the reaction depositing $TiO_2$ becomes very slow. If the concentration is above 0.5 mol/l, the formed film is non-uniform. Although the above concentration range is suitable for the present invention, the concentration range is preferably between 0.1 mol/l and 0.4 mol/l and more preferably between 0.2 mol/l and 0.3 mol/l. With such concentration ranges, the formed film has the improved uniformity and transparency.

In the present invention, the substrate on which the film is formed is not specifically limited provided that it does not adversely affect the photocatalytic activity of the formed film. Thus, the substrate is made of an inorganic and/or an organic materials. For example, glasses, oxides and/or metals are the preferred materials for the substrate. Furthermore, the substrate may be coated with an inorganic paint and/or an organic paint. When the substrate is covered with such a paint, it is effective to prevent the film from being peeled off and/or cracked when it is dried or calcined.

In addition, the present invention makes it possible to form a film having a substantially uniform thickness on the surface of the substrate which may be not only in the form of a flat plate but also in a complicated form such as a fabric (including woven, knitted and non-woven materials). Fibers which constitute the fabric may be of any possible materials provided that they do not adversely affect the titanium dioxide film. For example, glass wool, stainless steel wool, teflon wool and the like may be used as the substrate.

The following substrates are exemplified as other substrates; lighting fixtures, range hoods, kitchen units, toilet units, bathroom units, storage units, construction materials, bedding, curtains, carpets, household appliances, cooking utensils, tableware, cars, bicycles, personal items, clothes, purification (or clarification) equipments, water systems and items for pets. The substrate may be a portion or a part of the substrate as described above. The substrate in the present invention may be outer surfaces and/or inner surfaces (portions which are wetted when put into a liquid) of the above mentioned example.

More concrete examples of the substrate are as follows:

(a) lighting fixtures include reflectors, covers and shades, and range hoods include filters, hoods and ventilation fans;

(b) kitchen units include tables, cupboards, walls, tiling and ceilings;

(c) toilet units include walls, toilet seats and bowls;

(d) bathroom units include bathtubs, walls, tiling and ceilings;

(e) storage units include shoe cupboards, closets, chests of drawers, under-floor storage spaces, rice chests, cool boxes and trash cans;

(f) construction materials include materials for external walls, bricks, partition walls, (Japanese) sliding doors, (Japanese) paper windows and flooring;

(g) bedding includes quilts, pillows and blankets;

(h) household appliances include television sets, video recorders, record players, air conditioners, heaters, vacuum cleaners, washing machines, refrigerators, electric kettles, kotatsu (low tables with built-in electric heaters), rice cookers, razors for men and women and hair driers;

(i) cooking utensils include pots and pans, kettles and frying pans;

(j) tableware includes glasses, cups and bowls;

(k) cars include car windows and steering wheels;

(l) personal items include hats, bags, watches, fishing rods, shoes, false teeth and contact lenses;

(m) clothes include uniforms, business suits, socks, underwear, coats, jackets, sweaters, sweatshirts, shirts, trousers, kimono, skirts, pantyhose and tights;

(n) purification equipment includes waste water treatment units, purification tanks, air filters, water filters and garbage disposal;

(o) water systems include swimming pools, aquariums, fish preserves and rocks for garden pond; and (p) items for pets include hutch, kennels and birdcages.

Due to the photocatalytic activity, the titanium dioxide film according to the present invention decomposes various kinds of dirt which adheres to the substrate so that the substrate is unlikely to be covered with such dirt, and even if the substrate is likely to be covered with the dirt, it is decomposed and removed. Thus, it is to be noted that the "photocatalytic activity" in the present invention is intended to mean an activity to decompose organic materials such as dirt and the like in air or liquid in which titanium dioxide is placed or on a surface of titanium dioxide by irradiating titanium dioxide with rays within the ultraviolet range.

In the present invention, the film is calcined in air or an inert gas such as nitrogen after it has been formed while deposited, and a calcining temperature is preferably in a range between 100° C. and 700° C. provided that the substrate having the film thereon is not adversely affected by the calcination. If the temperature is below 100° C., the resulted photocatalytic activity may be too low for certain applications and the film may not sufficiently adhere to the substrate. If the temperature is above 700° C., also the resulted photocatalytic activity may be low. However, the film on the substrate may be calcined at a temperature below 100° C. at the expense of the adhesion of the film to the substrate and/or photocatalytic activity. Optionally, the calcining step may be omitted depending on individual applications.

Within the above calcination temperature range, preferably a range between 250° C. and 600° C. and more preferably a range between 300° C. and 500° C. is employed under the consideration of the film adhesion to the substrate and the photocatalytic activity of the film.

Upon the calcining step is carried out, a period thereof is preferably in a range between 0.5 hour and 6 hours, and more preferably in a range between 1 hour and 3 hours, for example 2 hours.

Before the calcination as described above, washing and/or drying of the deposited film may be optionally carried out. The washing step removes unnecessary components as much as possible and it is preferably carried out using water. This washing may be omitted if most of the unnecessary components are removed by dehydration from the substrate. The drying step may be carried out at a temperature within a range between the room temperature °C. and 150° C. The present invention may be carried out without drying since a initial period of calcination may be regarded to be a kind of the drying step.

A thickness of the titanium dioxide film according to the present invention is preferably in a range between 100 nm and 2000 nm and more preferably in a range between 600 nm and 1000 nm for effective decomposition of organic materials in air or water and in a range between 50 nm and 200 nm for preventive maintenance of solid surfaces from dirt. When the film thickness is below 50 nm, the activity may be insufficient for the decomposition of the organic materials. If the film thickness is above 2000 nm, the activity may not be so improved relative to increase of the thickness. However, the lower thickness below 50 nm, for example 10 nm may be suitable depending on the individual applications. Such thin films may be applied to substrates on which less dirt is deposited. For example, so thin film may be applied for antifouling glasses.

The resulting thickness of the titanium dioxide film depends on a period for and a temperature at which the substrate is contacted with (or immersed in) the solution comprising water, the additive and ammonium titanium fluoride, for example an immersion period and an immersion temperature of the substrate in the reaction solution. The above preferable thickness may be obtained usually at a temperature in a range between 20° C. and 50° C., for example 30° C. for a period in a range between 30 hours and 40 hours, for example 72 hours for the purpose of the organic material decomposition in air or liquid. For the purpose of the preventive maintenance of solid surfaces from dirt, the film may be formed at a temperature in a range between 20° C. and 50° C., for example 30° C. for a period in a range between 1 hours and 14 hours, for example 2 hours.

In the most preferable embodiment of the present invention, the combination of the parameters for the formation of the titanium dioxide film may be as follows:

ammonium titanium fluoride concentration in reaction solution: 0.08–0.12 mol/l additive concentration in reaction solution: 0.2–0.3 mol/l deposition period: 2–5 hrs (in case of preventive maintenance), and 48–72 hrs (in case of organic material decomposition)

deposition temperature: 30° C.

calcination temperature: 300°–500° C.

calcination period: 1–2 hrs resulted film thickness: 50–200 nm (in case of preventive maintenance), and 700–1000 nm (in case of organic material decomposition)

The solution comprising ammonium titanium fluoride, the additive and water used according to the present invention may further contain other compounds provided that they do not adversely affect the photocatalytic activity of the titanium dioxide film. For example, the solution may contain hydrochloric acid.

In one of the preferred embodiments of the present invention, another liquid may be added which has a limited solubility into (or miscibility with) the reaction solution (preferably which is substantially immiscible with the solution), and which has a larger specific gravity than that of the reaction solution so that a two phase system is formed in which the reaction solution phase is placed above said another liquid phase. This another liquid preferably dissolves much less additive and ammonium titanium fluoride. As such a liquid, chlorobenzene is preferably used.

When such a liquid is used, titanium dioxide which is precipitated but which does not accumulate on the substrate surface settles downward through the reaction solution phase into the another liquid phase which is located below the reaction solution due to its own weight. This means that precipitated titanium dioxide which can be a seed for subsequent precipitation and which does not accumulate on the surface of the substrate does not remain in the reaction solution phase so that the deposition occurs mostly at an interface between the substrate (i.e. a solid phase) and the reaction solution phase, whereby the uniformity of the titanium dioxide film formed on the substrate is improved and also unnecessary precipitation in a reaction solution bulk is prevented as much as possible (which gives economical precipitation).

According to the present invention, the additive is added so as to the reaction equilibrium is shifted toward the supersaturation of titanium dioxide in the reaction solution and the substrate is contacted with the solution in the supersaturated condition of titanium dioxide so that titanium dioxide film is deposited on the substrate (which may be called as "liquid phase deposition"). Thus, the deposited film of titanium dioxide is not affected by the shape (or geometry) of the substrate. Therefore, even if the substrate is of a complicated structure, the titanium dioxide film having a uniform thickness and better crystallinity is provided.

The titanium dioxide film deposited in the liquid phase according to the present invention has a higher crystallinity of anatase which resulting in the higher photocatalytic activity when compared with a conventionally formed titanium dioxide film such as that formed by the Sol-Gel process. Such higher crystallinity (i.e. a peak shape was very sharp) was confirmed by the X-ray diffraction.

In addition, the liquid phase deposition according to the present invention provides the more uniform titanium dioxide film compared with other conventional films formed by, for example, the dry processes (such as the CVD process and the Sputtering process) and the Sol-Gel process which use dehydration or condensation between the vapor phase and the liquid phase. This is because the liquid phase deposition utilizes the chemical reaction in the liquid phase so that a chemical composition of titanium dioxide is likely to be uniform throughout the film. Thus, the formed titanium dioxide film has the improved transparency and crystallinity.

The following are examples of the present invention as well as comparative examples. It should be noted that the present invention is not limited to those examples.

EXAMPLE 1

62.5 ml of an ammonium titanium fluoride aqueous solution (0.4 mol/l) and 100 ml of a boric acid aqueous solution (0.5 mol/l) as the additive and additional water were mixed to prepare 250 ml of a reaction solution (thus, the concentrations of ammonium titanium fluoride and the additive were 0.1 mol/l and 0.2 mol/l, respectively based on the final reaction solution total) when a substrate was to be dipped in the reaction solution.

A glass plate (having a surface area of 25 cm$^2$) as the substrate was immersed in the reaction solution thus prepared for 72 hours at a temperature of 30° C., whereby a titanium dioxide film was formed on the plate.

After sufficiently washing the glass plate with water and drying at room temperature, it was calcined in air for 2 hours at a temperature of 300° C. to have a substrate having a titanium dioxide film according to the present invention. The titanium dioxide film had a thickness of 1000 nm. When a permeation ratio of visible light of the titanium dioxide film was measured, it was found to be about 65%.

EXAMPLE 2

Example 1 was repeated except that a steel plate which was coated with a white melamine paint (surface area: 25 cm$^2$) was used in place of the glass plate and that the calcination was carried out at a temperature of 100° C. for 2 hours, whereby forming on the plate a titanium dioxide film (thickness: 1000 nm) with the photocatalytic activity.

EXAMPLE 3

Example 1 was repeated except that a stainless steel plate (surface area: 25 cm$^2$) was used in place of the glass plate, whereby forming on the plate a titanium dioxide film (thickness: 1000 nm) with the photocatalytic activity.

EXAMPLE 4

Example 1 was repeated except that 100 ml of chlorobenzene was added in 250 ml of the reaction solution so as to form another liquid phase separated below the reaction solution phase, that the glass plate was kept in the reaction solution phase and that calcination was carried out at a temperature of 300° C. for 2 hours, whereby forming on the plate a titanium dioxide film (thickness: 1000 nm) with the photocatalytic activity.

EXAMPLE 5

Example 1 was repeated except that a period of the immersion in the reaction solution was 2 hours, whereby forming on the plate a titanium dioxide film (thickness: 40 nm) with the photocatalytic activity.

Comparative Example 1

A solution containing 3% by weight of TiO$_2$ was prepared using a titania-sol solution (commercially available from Fuji Titanium Industry Co., Ltd. as trade name of DC-Ti) and water. A glass plate (having a surface area of 25 cm$^2$) was immersed in 300 ml of thus prepared solution followed by lifting up the plate at a rate of 20 cm/min., whereby the plate was dip-coated. The plate was then dried at a temperature of 100° C. followed by calcining in air at a temperature of 300° C., whereby forming on the plate a titanium dioxide film (thickness: 1000 nm).

Comparative Example 2

A coating solution containing isopropoxyde titanate, ethanol and diethanolamine in a weight ratio of 1:20:0.1 was prepared. The coating manner was in principle the same as in Comparative Example 1 but the immersion followed by the calcination was repeated three times, whereby a titanium dioxide film was formed on the plate.

The film had a thickness of 0.7 μm. When a permeation ratio of visible light of the titanium dioxide film was measured, it was found to be about 60%.

In order to estimate the photocatalytic activity of a titanium dioxide films formed in each of the above Examples and Comparative Examples, a plate piece (size: 5 cm×5 cm) having the film thereon was cut out from the original plate. The piece was sealed in a quartz vessel (volume: 300 ml) and acetaldehyde was then injected into the vessel to reach its concentration in the vessel of about 50 ppm. Thereafter, black light (10 W, commercially available from Matsushita Electric Industrial Co., Ltd. as a trade name of FL 10 BLB) was irradiated to the vessel and a half-value period of the acetaldehyde concentration was measured, whereby a photocatalytic acetaldehyde decomposition activity was estimated. The results are shown in Table 1 below:

TABLE 1

|  | Half-Value Period |
|---|---|
| Example 1 | 10 min. |
| Example 2 | 60 min. |
| Example 3 | 15 min. |
| Example 4 | 10 min. |
| Example 5 | 180 min. |
| Comparative Example 1 | 180 min. |
| Comparative Example 2 | 300 min. |

As can be seen from Table 1, all the titanium dioxide films according to the present invention showed considerably shorter half-value periods for acetaldehyde compared with that of the Comparative Example. Even when the thickness is so small as in Example 5, the activity is still the same as in Comparative Example 1. That is, the titanium dioxide films according to the present invention have the improved photocatalytic activities. Furthermore, it can be seen according to the measurement results of the permeation ratio of visible light that the present invention effecitvely provides the titanium dioxide film having the improved uniformity.

EXAMPLE 6

Glass wool as a substrate (25 g, commercially available from Nakaraitesque as a trade name of glass wool 167-38, fiber diameter: 10 μm) which was sufficiently cleaned was immersed in 250 ml of a reaction solution as in Example 1 at a temperature of 30° C. for 72 hours. Taking out the substrate from the solution, it was sufficiently washed with water and dried followed by calcining at 500° C. for 2 hours, whereby titanium dioxide film was formed on the substrate. The film had a thickness of 1000 nm.

EXAMPLE 7

Example 6 was repeated except that calcination was not carried out but the substrate was dried at a room temperature (25° C.) after washing. The film had a thickness of 1000 nm.

EXAMPLE 8

Example 6 was repeated except that quartz wool was used in place of the glass wool. The quartz wool (25 g) was had a diameter of 6–12 µm (available from Toshiba Ceramics as a trade name of Quartz Glass Wool B-Grade). The film had a thickness of 1000 nm.

Comparative Example 3

Titanium tetraisopropoxyde was dissolved into ethanol to reach a concentration of 0.5 mol/l. Glass wool (which was the same as in Example 6) was immersed into the alcohol solution. Water was then added to the alcohol solution to reach a water concentration of 50 mol/l while stirring. After the addition of water, the solution was stirred for another one hour. Taking out the glass wool from the solution, it was dried at a temperature of 100° C. for one hour followed by calcining at a temperature of 500° C. for one hour. Thus, a fibrous composite material of the glass wool with the titanium dioxide film was produced. However, the film was not complete and the glass wool was exposed in many portions thereof.

Comparative Example 4

Comparative Example 3 was repeated except that the glass wool was immersed for 30 minutes and calcination was not carried out. The fibrous composite material had a titanium dioxide film was produced. However, the film was not complete and the glass wool was exposed in many portions thereof.

In order to estimate the photocatalytic activity of a fibrous composite having titanium dioxide film produced in each of the above Examples 6 to 8 and Comparative Examples 3 and 4, one gram of the composite was sealed in a quartz vessel (volume: 300 ml) and acetaldehyde was then injected into the vessel to reach its concentration in the vessel of about 50 ppm. Thereafter, black light (10 W, commercially available from Matsushita Electric Industrial Co., Ltd. as a trade name of FL 10 BLB) was irradiated to the vessel and the half-value period of the acetaldehyde concentration was measured, whereby a photocatalytic acetaldehyde decomposition activity was estimated. The results are shown in Table 2 below:

TABLE 2

|  | Half-Value Period |
|---|---|
| Example 6 | 5 min. |
| Example 7 | 30 min. |
| Example 8 | 4 min. |
| Comparative Example 3 | 120 min. |
| Comparative Example 4 | >600 min. |

As can be seen from Table 2, the composite according to the present invention provides the excellent photocatalytic activity compared with that of the composite of the prior art.

What is claimed is:

1. A process of forming a titanium dioxide film having a photocatalytic activity comprising:

depositing a film of titanium dioxide by adding an additive in a reaction solution comprising ammonium titanium fluoride and water which additive shifts the following equilibrium reaction:

$$(NH_4)_2TiF_6 + 2H_2O <=> TiO_2 + 4HF + 2NH_4F$$

toward a right side, and calcining the deposited titanium dioxide film.

2. A process according to claim 1 wherein the additive is boric acid.

3. A process according to claim 1 wherein another liquid phase is present below the reaction solution and a liquid of the another liquid phase is immiscible with the reaction solution and has a larger specific gravity than the reaction solution.

4. A substrate of which a surface is coated with a titanium dioxide film having a photocatalytic activity, which substrate is obtained by:

depositing a film of titanium dioxide on a surface of a substrate by contacting the substrate with a reaction solution comprising ammonium titanium fluoride, water and an additive which shifts the following equilibrium reaction:

$$(NH_4)_2TiF_6 + 2H_2O <=> TiO_2 + 4HF + 2NH_4F$$

toward a right side, and calcining the deposited titanium dioxide film.

5. A substrate according to claim 4 wherein the additive is boric acid.

6. A substrate according to claim 4 wherein the substrate comprises at least one member selected from the group consisting of a glass, an oxide and a metal.

7. A substrate according to claim 4 wherein the substrate is coated with a paint.

8. A substrate according to claim 7 wherein the paint comprises an inorganic paint.

9. A substrate according to claim 7 wherein the paint comprises an organic paint.

10. A substrate according to claim 4 wherein another liquid phase is present below the reaction solution and a liquid of the another liquid phase is immiscible with the reaction solution and has a larger specific gravity than the reaction solution.

11. A process of producing a substrate of which a surface is coated with a titanium dioxide film having a photocatalytic activity, which process comprises:

depositing a film of titanium dioxide on a surface of a substrate by contacting the substrate with a reaction solution comprising ammonium titanium fluoride, water and an additive which shifts the following equilibrium reaction:

$$(NH_4)_2TiF_6 + 2H_2O <=> TiO_2 + 4HF + 2NH_4F$$

toward a right side, and calcining the deposited titanium dioxide film.

12. A process according to claim 11 wherein the additive is boric acid.

13. A process according to claim 11 wherein the substrate comprises at least one member selected from the group consisting of a glass, an oxide and a metal.

14. A process according to claim 11 wherein the substrate is coated with a paint.

15. A process according to claim 14 wherein the paint comprises an inorganic paint.

16. A process according to claim 14 wherein the paint comprises an organic paint.

17. A process according to claim 11 wherein another liquid phase is present below the reaction solution and a liquid of the another liquid phase is immiscible with the reaction solution and has a larger specific gravity than the reaction solution.

* * * * *

UNITED STATES PATENT AND TRADEMARK OFFICE
CERTIFICATE OF CORRECTION

PATENT NO. : 5,811,192
DATED : September 22, 1998
INVENTOR(S) : K. TAKAHAMA et al.

It is certified that error appears in the above-identified patent and that said Letters Patent is hereby corrected as shown below:

On the printed patent cover, at paragraph [56], line 29 (second column, line 3), References Cited, Foreign Patent Documents, the following was omitted and should be inserted:
—59141441 08/1984 Japan—
—193443 04/1989 Japan—
—3285822 12/1991 Japan—
—4130017 05/1992 Japan—
—7232080 09/1995 Japan—
—891839 04/1996 Japan—
—899041 04/1996 Japan—
—8103488 04/1996 Japan—.

On the printed patent cover, at paragraph [56], line 38 (second column, line 11), References Cited, Other Publications, the following was omitted and should be inserted: —DEKI et al., "Titanium (IV) Oxide Thin Films Prepared from Aqueous Solution," Chemistry Letters 1996, June 1996, pp. 433-434.—

Signed and Sealed this

Sixteenth Day of May, 2000

Attest:

Q. TODD DICKINSON

*Attesting Officer*     *Director of Patents and Trademarks*